No. 830,267. PATENTED SEPT. 4, 1906.
W. WESTNEY.
VEHICLE TIRE.
APPLICATION FILED NOV. 23, 1905.

Witnesses
Frank G. Campbell.
B. G. Gardner.

Inventor
William Westney
by Shepherd & Parker
Attorneys

UNITED STATES PATENT OFFICE.

WILLIAM WESTNEY, OF SCOTLAND, CONNECTICUT.

VEHICLE-TIRE.

No. 830,267.  Specification of Letters Patent.  Patented Sept. 4, 1906.

Application filed November 23, 1905. Serial No. 288,689.

*To all whom it may concern:*

Be it known that I, WILLIAM WESTNEY, a citizen of the United States, residing at Scotland, in the county of Windham and State of Connecticut, have invented certain new and useful Improvements in Vehicle-Tires, of which the following is a specification.

My invention relates to a vehicle-tire, and has for its object the provision of a device of this character which will be simple and inexpensive in construction and will be very resilient and durable.

A further object of the invention is the provision of a vehicle-tire having an elastic core and a resilient metallic tread portion.

Further objects and advantages of the invention will be set forth in the detailed description, which now follows.

Figure 1:
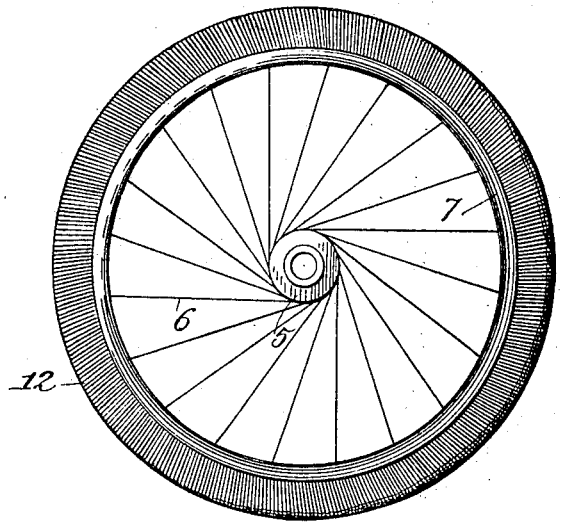
Figure 2:
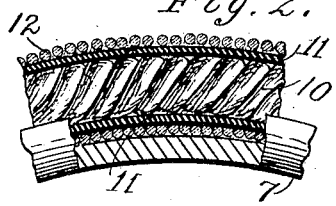

In the accompanying drawings, Figure 1 is a side elevation of an automobile-wheel having my improved vehicle-tire applied thereto, and Fig. 2 is a vertical sectional view of a portion of a vehicle-tire constructed in accordance with the present invention.

Like numerals designate corresponding parts in both figures of the drawings.

Referring to the drawings, the numeral 5 designates the hub, 6 the spokes, and 7 the rim, of an automobile-wheel.

My improved tire comprises an outer resilient covering constituted by an endless coil-spring 12, within which is a core 10, of fibrous material, preferably rope, which is surrounded by an elastic rubber tube 11, disposed within the spring 12.

From the foregoing description it will be seen that a vehicle-tire is herein provided which will be very resilient and which will not be liable to puncture.

While the elements herein shown and described are well adapted to serve the purpose for which they are intended, it is to be understood that the invention is not limited to the precise construction set forth, but that changes within the scope of the appended claims may be resorted to without departure from said invention.

Having described my invention, what I claim is—

1. A vehicle-tire having an outer peripheral covering composed of an endless coiled spring, a core formed of rope passing through said spring, and a rubber cushion lying between said rope and said spring.

2. A vehicle-tire having an outer peripheral covering composed of an endless coiled spring, a rope core passing through said spring and a rubber tube which incloses said rope core and lies within the coiled spring.

In testimony whereof I affix my signature in presence of two witnesses.

WM. WESTNEY.

Witnesses:
GEORGE N. PERRY,
CHAS. W. KENYON.